(12) United States Patent
Rowe et al.

(10) Patent No.: US 6,344,848 B1
(45) Date of Patent: Feb. 5, 2002

(54) STYLUS ASSEMBLY

(75) Inventors: Richard Rowe; Kulbir Sandhu, both of San Jose, CA (US)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/253,588

(22) Filed: Feb. 19, 1999

(51) Int. Cl.$^7$ ............................................... G09G 5/00
(52) U.S. Cl. ........................................................ 345/179
(58) Field of Search ............................. 345/179, 180; 178/18–20; 81/181–182, 437–439; 7/160–162, 165, 167

(56) References Cited

U.S. PATENT DOCUMENTS

| | | | |
|---|---|---|---|
| 3,744,034 A | 7/1973 | Paul | 340/172.5 |
| 4,860,372 A | 8/1989 | Kuzunuki et al. | 382/13 |
| 4,972,496 A | 11/1990 | Sklarew | 382/13 |
| 5,018,411 A | * 5/1991 | La Padura | 81/57.5 |
| 5,231,381 A | 7/1993 | Duwaer | 340/712 |
| 5,305,394 A | 4/1994 | Tanaka | 382/13 |
| 5,389,745 A | 2/1995 | Sakamoto | 178/18 |
| 5,434,929 A | 7/1995 | Beernink | 382/187 |
| 5,444,192 A | 8/1995 | Shetye et al. | 178/18 |
| 5,452,371 A | 9/1995 | Bozinovic et al. | 382/187 |
| 5,528,743 A | 6/1996 | Tou et al. | 395/148 |
| 5,534,892 A | 7/1996 | Tagawa | 345/173 |
| 5,615,284 A | 3/1997 | Rhyne et al. | 382/187 |
| 5,621,817 A | 4/1997 | Bozinovic et al. | 382/189 |
| 5,630,148 A | 5/1997 | Norris | 395/750 |
| 5,635,682 A | * 6/1997 | Cherdack | 187/18 |
| 5,638,566 A | * 6/1997 | Wu | 7/167 |
| 5,698,822 A | 12/1997 | Haneda et al. | 178/18 |
| 5,841,901 A | 11/1998 | Arai et al. | 382/187 |
| 5,916,278 A | * 6/1999 | Garcia | 7/165 |
| 5,973,677 A | * 10/1999 | Gibbons | 345/179 |
| 6,064,374 A | * 5/2000 | Fukuzaki | 345/179 |

OTHER PUBLICATIONS

Gray, R. et al., "Efficient MC68HC08 programming: reducing cycle count and improving code density", *Dr. Dobb's Journal*, vol. 20, No. 5, May 1995, pp. 70–75.

Ruley, J. et al., "Handheld–to–Handheld Combat", *Windows Magazine*, No. 811, p. 55, Nov. 1997.

Forbes, J. et al., "Palm PCs get a Big Hand (What's Hot)", *Windows Magazine*, No. 905, p. 96, May 1998.

Penwarden, M., "More Muscle for HP's OmniBook", *Windows Magazine*, No. 501, p. 110, Jan. 1994.

Feigel, C., "IBM, Motorola preview embedded PowerPCs; 403 and 505 processors combine strong performance with low cost", *Microprocessor Report*, vol. 8, No. 6, pp. 1–5, May 1994.

Dayton, D., "FRx extends reporting power of Platinum Series", *PC Week*, vol. 8. No. 5, p. 29(2), Feb. 1991.

* cited by examiner

*Primary Examiner*—Almis R. Jankus
(74) *Attorney, Agent, or Firm*—Hickman Palermo Truong & Becker LLP; Van Mahamedi

(57) ABSTRACT

A stylus assembly adapted to enter data into an electronic device and provide a user with a tool to access the electronic device to maintain and/or repair the electronic device. The stylus assembly includes a stylus body and a stylus point coupled to the stylus body. The stylus point further includes a first end for entering data into and electronic device, such as a personal data assistant, and a second end coupled to the stylus body. A tool is then detachably coupled to one of the stylus body and the second end of the stylus point. When the tool is not accessing the electronic device and the stylus body and the stylus point are coupled together the tool is disposed within the other of the stylus point and the stylus body to which it is not attached.

31 Claims, 7 Drawing Sheets

STYLUS ASSEMBLY

BACKGROUND OF THE INVENTION

1. Field of the Invention

The present invention relates to a multiple part stylus assembly for entering data into a hand held electronic device; and in particular to a stylus assembly for entering data and performing maintenance and/or repairs to the hand held electronic device.

2. Discussion of the Related Art

The Palm Pilot™ of the 3COM Corporation, and various hand held electronic devices such as a personal data assistant "PDA," have become extremely popular and prevalent in recent years. It is convenient to have an electronic device to maintain useful data such as appointments, phone numbers, things to do lists, and etc. Occasionally these electronic devices, or hand held electronic devices, will experience difficulties or even lock-up and require resetting before functionality is restored. The device is normally reset by accessing a switch through a hole in a casing of the device. Typically a paper clip, or similarly dimensioned object, is inserted into the hole to actuate the switch and reset the device, but such an object for resetting the device may not always be available While resetting the device seems like a relatively simple procedure, it can have dire consequences if not done properly. If the object used to reset the device is of a larger diameter than the diameter for the hole in the casing, it could damage the casing as well as the reset switch. Furthermore, the object may be of an appropriate diameter but is longer than it needs to be and the user may insert it too far into the hole while attempting to reset the device. This can also damage the reset switch rendering the device inoperative and useless to the user. Therefore, it is desirable to provide a user with such a device.

A further problem that arises as a direct consequence of the hand held device being small, light weight and mobile is that from time to time the device gets jostled severely and even dropped. This can result in the memory card or other internal component becoming dislodged from its seating. If the user determines that the memory card is unseated, the user must wait until he/she has the necessary equipment to obtain access to the memory card. The result is that the device is again rendered inoperative and useless to the user. Therefore it is desirable to provide the user with such a tool.

SUMMARY OF THE INVENTION

Accordingly, various embodiments include two and three part stylus assemblies that provide the user with the ability to enter data and effectuate maintenance and/or repairs to hand held electronic devices with the necessary equipment housed within the stylus assembly.

Some embodiments of the invention include a stylus and assembly having at least one tool to enable a user to make minor repairs to a hand held electronic device. The tool is housed within the interior of the stylus assembly. Optionally, this tool may be interchanged with multiple tools to make a variety of occasional minor repairs.

The multi-part stylus assembly can be coupled and decoupled together by conventional means. The interior portions of the assembly are adapted, e.g. hollowed out, to accommodate the tool when the assembly is coupled. Each portion of the assembly independently may either be completely are partially hollow, depending on factors such as the weight, size constraints and function of the particular portion of the stylus assembly.

A stylus assembly in one embodiment includes a stylus body and a stylus point. The stylus body and the stylus point are adapted to be coupled together. A tool is coupled to one of the stylus body and the stylus point. The tool may be detachably coupled together to the stylus body, or the stylus point, and also interchanged with other tools. The tool is adapted to correspond to the particular electronic device owned by the user.

Thus, the present invention provides advantages over conventional stylus assemblies by providing a stylus assembly capable of entering data into an electronic device and also provides the user with a convenient, readily accessible, and appropriate tool to perform maintenance and/or minor repairs to the electronic device.

In some embodiments, the stylus assembly can include a tool to engage the electronic device. Engaging the electronic device can include resetting a palm-sized computer.

Other embodiments include a stylus assembly adapted to enter data into an electronic device and provide a user with multiple tools to engage the electronic device.

Some embodiments of the invention include a palm-sized computer including a stylus having at least a two-part assembly. The assembly includes a tool that can be used to reset the palm-sized computer. Alternatively, the stylus can include a tool to aid in opening the palm-sized computer. Alternatively, the stylus can include a tool to reset the palm-sized computer and to aid in opening the palm-sized computer.

Additional features and advantages of the invention will be set forth in the description which follows, and in part will be apparent from the description, or may be learned by practice of the invention. The aspects and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the embodiments of the present invention, examples of which are illustrated in the accompanying drawings.

Figure 1:
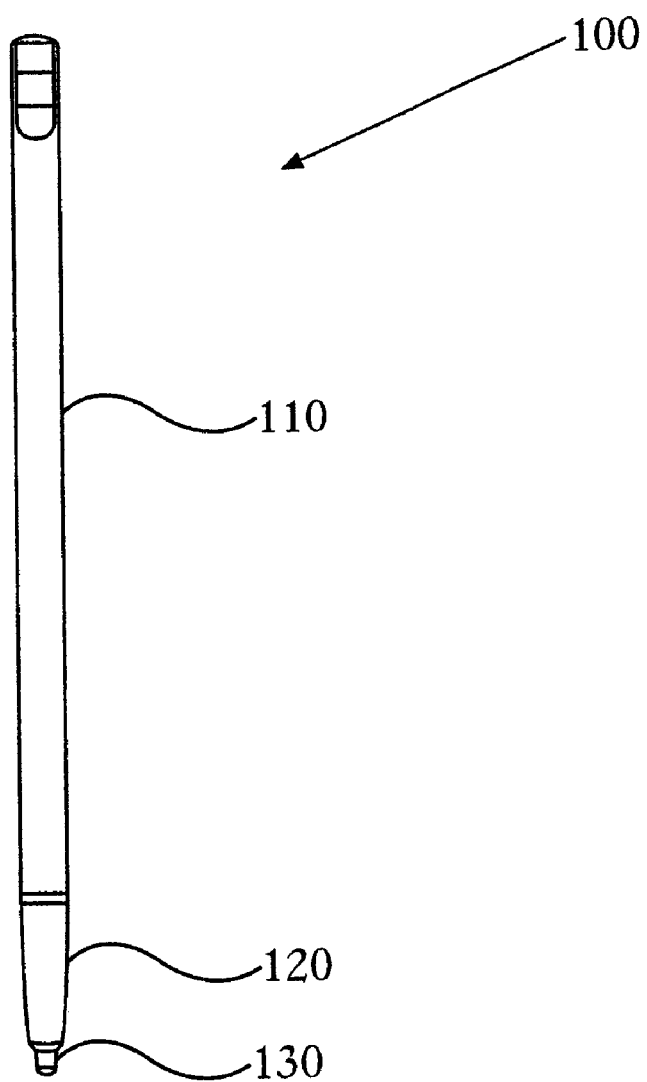
FIG. 1 is a one dimensional view illustrating a two part stylus in its coupled position.

FIG. 1 is a one dimensional view illustrating a two part stylus in a coupled position. The two part stylus or assembly 100 is adapted to be used with and enter data into a personal electronic device (not shown). The stylus 100 may be utilized to enter data into a personal data assistant "PDA", or palm-sized computer, such as a Palm Pilot III™ manufactured by the 3COM Corporation or a Windows CE compatible device. The two part stylus 100 includes a stylus body 110 coupled to a stylus point 120, and a clip or retainer 105 coupled to the stylus body 110. The clip 105 may be of a clasping or friction variety and may be adapted to retain the stylus body 110 within a housing of the electronic device upon insertion of the stylus 100 therein.

In an embodiment, the stylus body 110 and the stylus point 120 are coupled together by a threaded connection (not show), although the stylus body 110 and stylus point 120 may also be connected using fasteners, such as, for example snap-in and friction fasteners. The reader should note that any reference to a coupling or attachment of elements of a stylus being described employs one of the couplings as outlined above or a suitable conventional coupling. The stylus body 110 and the stylus point 120 can be formed of suitable rigid or semi-rigid materials such as glass, metal, plastic, or rubber type compounds. In one embodiment, the stylus body 110 is formed of a metal and the stylus point 120 is formed of a rubber type compound, or plastic adapted to be able to allow for the entering of data into a electronic device without harming a data input interface for entering the data (e.g. a touch sensitive screen).

The stylus point 120 further includes a stylus tip 130 for entering data by contacting the surface of the data input interface of the electronic device. In an embodiment, the electronic device is a personal electronic device or PDA and the input interface is an input screen or keypad. The stylus tip 130 is preferably a unitary body, but can be also be detachably coupled to stylus point 120. The stylus tip 130 can be formed of any suitable material, but is preferably formed of a plastic or rubber type compound identical to the material used for forming the stylus point 120, although it can be formed of a dissimilar material or compound.

Figures 2A, 2B:
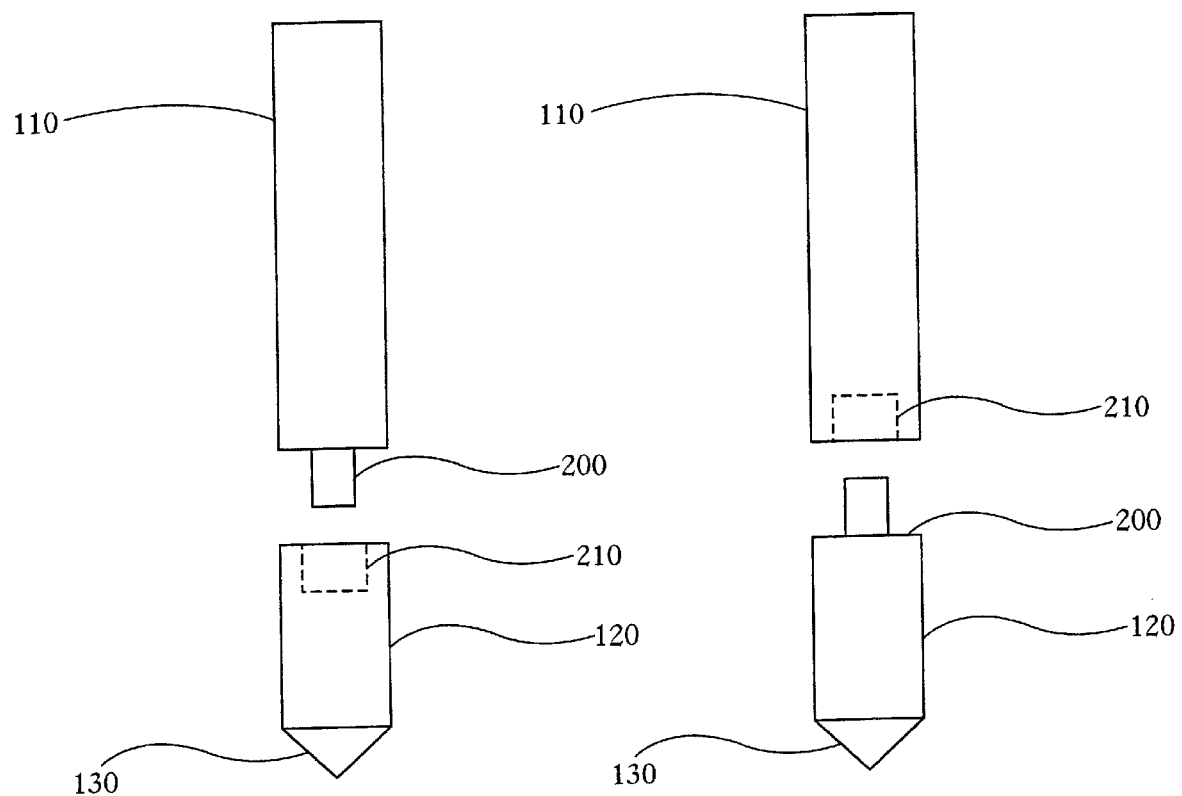
FIG. 2A is a one dimensional view of an embodiment of FIG. 1 in an uncoupled position.
FIG. 2B is a one dimensional view of an alternate embodiment of FIG. 1 in an uncoupled position.

FIGS. 2A and 2B are one dimensional views illustrating the two part stylus 100 of FIG. 1 in its uncoupled position. FIG. 2A illustrates one embodiment of the two part stylus 100 wherein a tool 200 is coupled to the stylus body 10 at one end. The tool 200 and the stylus body 110 can be formed as a unitary member in the manufacturing process, or bonded together, or they may be formed to be detachably coupled to each other. The tool 200 is any tool capable of assisting the user in performing various tasks, such as, for example maintenance on, repairs to, memory upgrades of, accessing internal circuitry of, and resetting the electronic device. As noted, occasionally the electronic device may experience difficulties and a tool is needed by the user to effectuate minor repairs without having to return the device to a repair center. In one embodiment, the tool 200 comprises a reset pin to reset the electronic device in case the electronic device ceases to function and needs to be reset before returning to normal operations.

In another embodiment the tool 200 includes, but is not limited to, one of an flat-head, or phillips-head type, or robertson type screw driver, or an allen-type or star configuration-type wrench. For example the Palm Pilot III™ employs phillips-type screws to secure a back panel to a housing of the Palm Pilot™ and therefore a tool 200 having a phillips-type head screw driver assists the user in accessing the internal components of the device. This may be necessary in the unlikely event that a memory card becomes dislodged from its seating pins if the device is dropped or jostled.

As the variety and scope of personal electronic devices increase the construction of each of course will differ. Therefore, the present invention contemplates a tool that is detachably coupled so that the tool 200 attached to the stylus 100 can be interchanged to accommodate future advances and modifications in the electronic devices.

Referring once again to FIGS. 2A and 2B, the tool 200 may be configured such that it is attached to the stylus body 110. In this configuration a slot or tool accommodation region 210 is formed within the stylus point 120 as depicted in FIG. 2A. The tool accommodation region is adapted to be of a length and width to receive the tool when the stylus body 110 and the stylus point 120 are in their coupled position as depicted in FIG. 1, which is the normal mode of operation of the stylus 100 for entering data. The coupled position is also the mode of operation for the stylus 100 when the user is not accessing the electronic device for repairs and/or maintenance. The tool accommodation region 210 preferably will be of a length sufficient to accommodate any tool contemplated to be attached to the stylus body 110. The stylus accommodation region 210 can also be lengthened to accommodate design parameters such as, but not limited to, weight, balance, or coupling requirements to sufficiently retain the detachable tool.

Now referring to FIG. 2B, the reader should note that the embodiment of FIG. 2B performs substantially in the same manner and provides substantially the same functions as the embodiment depicted and described with respect to FIG. 2A. This embodiment differs only in that the tool accommodation region 210 is now disposed within the stylus body 110 and the tool 200 is attached to the stylus point 120.

Figure 3:
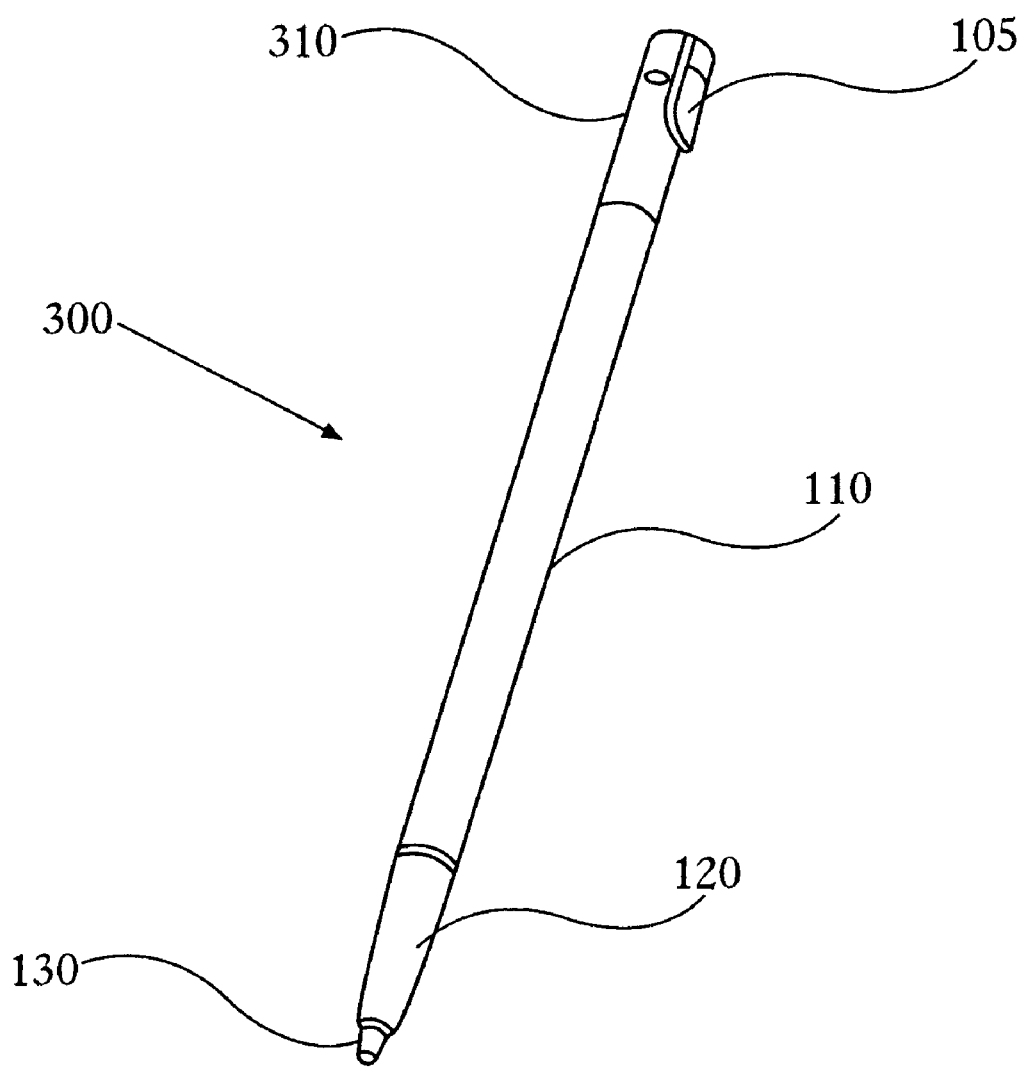
FIG. 3 is a one dimensional view illustrating a three part stylus in its coupled position.

FIG. 3 depicts a one dimensional perspective view illustrating a three-part stylus assembly in a coupled position. In the description of this embodiment elements of the three-part stylus that are common to the two-part stylus depicted in FIGS. 1 and FIG. 2 have the same reference numeral and therefore will not be discussed in detail. A three-part stylus or assembly 300 is comprised of a stylus quill, or cap 310, coupled to the stylus body 110 and a stylus point 120 coupled to the stylus body 110. The stylus point 120 further includes the stylus tip 130 coupled to the stylus point 120. The clip, or retainer 105, is attached to the stylus quill 310 to assist in retaining, or holding, the stylus 300 in the housing of the electronic device as previously described with respect to the two-part stylus 100. Note, the stylus 100 is formed to fit at least partially in an electronic device's housing when not being used. Other embodiments include stylus bodies in other shapes, such as a ballpoint pen.

Figure 4:
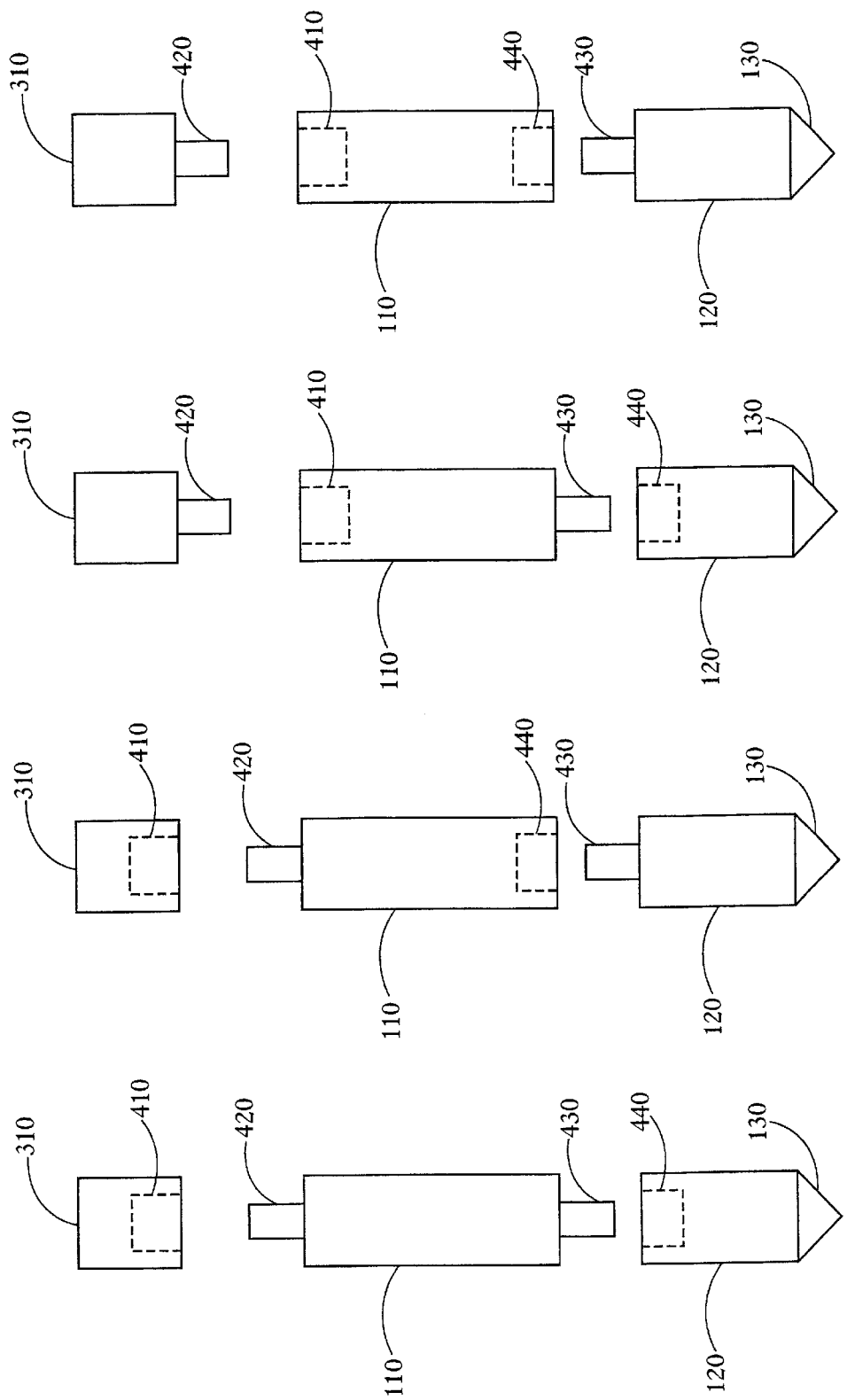
FIGS. 4A–4D depict one dimensional side views of alternate embodiments of FIG. 3 illustrating the three part stylus in its uncoupled position.

FIGS. 4A–4D depict a one dimensional view illustrating the three-part stylus in its uncoupled position. In one embodiment, as shown in FIG. 4A, stylus quill 310 further includes a tool accommodation region, or slot 410, formed within the stylus body. The stylus body 110 further comprises a first tool 420 and a second tool 430 coupled to stylus body 110. The first and second tool may be formed with the stylus body as a unitary member, or bonded to the stylus body 110, or detachably coupled to the stylus body 110 as previously described. The stylus point 130 further includes a tool accommodation region or slot 440 formed within the stylus point 130. When the stylus quill 310 is coupled with the stylus body 110 and the stylus body 110 is in turned coupled with the stylus point 130, the first tool 420 and second tool 430 are housed within the tool accommodation regions 410 and 440, respectively.

The first tool 420 and the second tool 430 can be any of the tools described with respect to the two-part stylus 100, but is not limited to the tools specifically identified. The first tool 420 and the second tool 430 may be the same type of tool but of different size or each may be a different tool. In one embodiment, the first tool comprises a reset pin formed of a metal, plastic or rubber type compound, and the second tool comprises a phillips-head type screw driver formed of a metal, or plastic or rubber type compound. It should also be noted that there need not be a second tool employed and the region for accepting could remain vacant to accommodate the development of future tools to access or maintain the electronic device.

FIGS. 4B–4D represents alternate embodiments of the invention depicting the positioning of the tools and tool accommodation regions in different configurations. Various alternate configurations may also be employed under the concepts of this invention.

Figure 5:
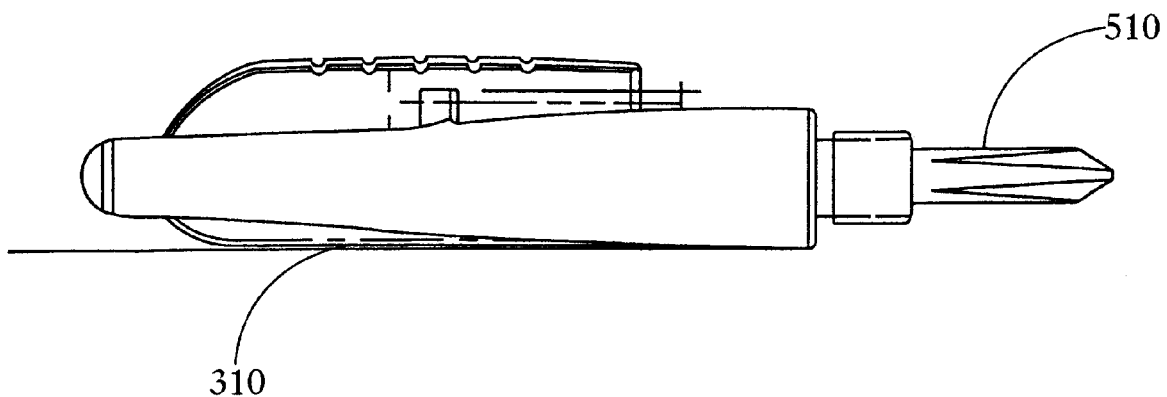
FIG. 5 is a one dimensional side view of an embodiment of the invention.

FIG. 5 is a one dimensional side view illustrating a stylus quill 310 coupled to a phillips-head type screw driver 510. The phillips-head type screw driver as depicted is formed integral with the stylus quill 310, but can be adapted to be detachably coupled to either the stylus quill 310, or stylus body 110, or stylus point 130 depending on the configuration employed. The stylus quill 310 shown is for a different example stylus than is shown in FIG. 3.

Figure 6:
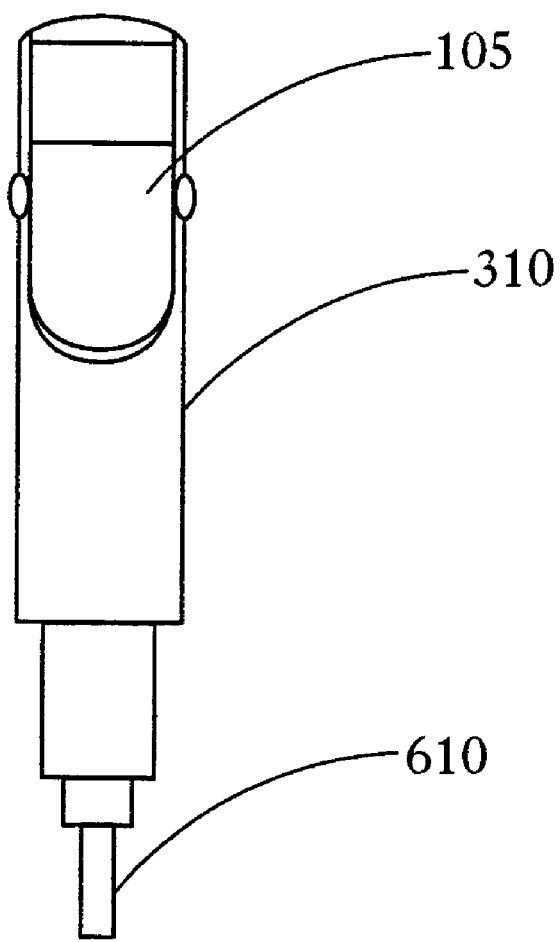
FIG. 6 is a one dimensional side view illustrating the stylus quill of FIG. 5 with a reset pin attached to the stylus quill.

FIG. 6 is a one dimensional side view illustrating the stylus quill 310 of FIG. 5 with a reset pin 610 coupled to the stylus quill 310. In any embodiment of the present invention, the reset pin 610 and the stylus quill 310 can be formed as a unitary member, or bonded together, or can be detachably coupled and is comprised of a plastic or rubber type compound.

Figure 7:
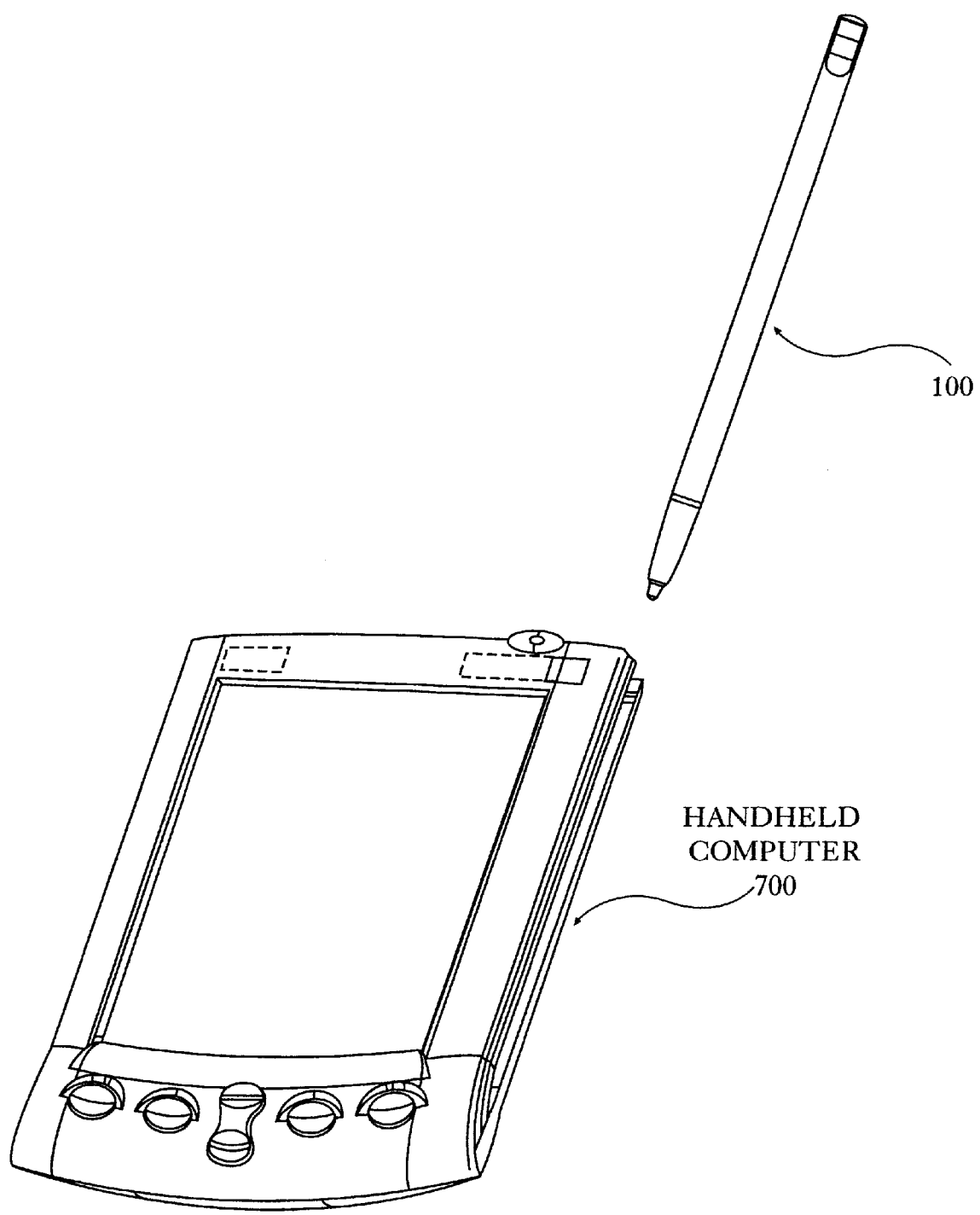
FIG. 7 illustrates an embodiment of the invention including a stylus and an electronic device.

FIG. 7 illustrates one embodiment of the invention including a stylus 100 with a handheld computer 700.

Some embodiments of the invention, include a PDA having a stylus formed as described above.

It will be apparent to those skilled in the art that various modifications and variations can be made in the novel stylus and assembly of the present invention without departing from the spirit or scope of the invention. Thus, it is intended that the present invention cover the modifications and variations of this invention provided they come within the scope of the appended claims and their equivalents.

What is claimed is:

1. A stylus for entering data into a handheld computer, the handheld computer including a housing having a slot formed therein, the stylus comprising:
   an end configured to enter data into the handheld computer by contacting the handheld computer; and
   a tool housed at least partially within the stylus, the tool being configured to engage a feature on the housing of the handheld computer;
   wherein the stylus is dimensioned to be stored within a slot of the handheld computer; and
   wherein the tool comprises one of a reset pin, a flat head-type screw driver, a phillips head-type screw driver, a robertson-type screw driver, and an allen wrench-type tool.

2. The stylus according to claim 1, wherein the tool interchanges with other tools.

3. The stylus according to claim 1, wherein at least a part of the stylus comprises a metal.

4. The stylus according to claim 1, wherein at least part of the stylus comprises a plastic.

5. The stylus assembly according to claim 1, wherein the tool includes a tool for resetting the handheld computer.

6. A stylus for entering data into a handheld computer, the handheld computer including a housing having a slot formed therein, the stylus comprising:
   an end configured to enter data into the handheld computer by contacting the handheld computer; and
   a tool housed at least partially within the stylus, the tool being configured to engage a feature on the housing of the handheld computer;
   wherein the stylus is dimensioned to be stored within a slot of the handheld computer; and
   wherein the tool is interchangeable with other tools.

7. A stylus assembly adapted to enter data into a handheld computer, the handheld computer including a housing having a slot formed therein, the stylus assembly comprising:
   a stylus quill;
   a stylus body, the stylus body including a first end and a second end, wherein the second end of the stylus body is coupled to the stylus quill, the stylus body being dimensioned to be received and stored within the slot of the handheld computer;
   a stylus point coupled to the stylus body, the stylus body including a first end to enter data into the handheld computer and a second end coupled to the stylus body;
   a plurality of tools, including a first tool and a second tool, the first tool being coupled to one of the stylus quill, the first end of the stylus body, the second end of the stylus body, and the second end of the stylus point, the second tool being coupled to another of the stylus quill, the first end of the stylus body, the second end of the stylus body, and the second end of the stylus point, wherein the first tool and the second tool are removeable coupled to the stylus body and configured to engage a feature on the housing of the handheld computer.

8. The stylus assembly of claim 7, wherein the first and the second tool comprises one of a reset pin, a flat head-type screwdriver, a phillips head-type screwdriver, a robertson-type screw driver, and an allen wrench type-tool.

9. The stylus assembly according to claim 8, wherein the coupling of the stylus quill and the stylus body and the coupling of the stylus body and the stylus point comprises a threaded connection.

10. The stylus assembly according to claim 9, wherein the coupling of the stylus quill and the stylus body and the coupling of the stylus body and the stylus point comprises a threaded connection.

11. The stylus assembly according to claim 7, wherein the first tool is coupled with the stylus quill and is disposed within the stylus body.

12. The stylus assembly according to claim 11, wherein the second tool is coupled with the stylus body and is disposed within the stylus point.

13. The stylus assembly according to claim 11, wherein the second tool is coupled with the stylus point and is disposed within the stylus body.

14. The stylus assembly according to claim 7, wherein the first tool is coupled with the stylus body and is disposed within the stylus quill.

15. The stylus assembly according to claim 14, wherein the second tool is coupled with the stylus body and is disposed within the stylus point.

16. The stylus assembly according to claim 14, wherein the second tool is coupled with the stylus point and is disposed within the stylus body.

17. The stylus assembly according to claim 7, wherein the second tool is coupled with the stylus body and is disposed within the stylus point.

18. The stylus assembly according to claim 7, wherein the second tool is coupled with the stylus point and is disposed within the stylus body.

19. An assembly for use with a handheld computer, the handheld computer including a housing having a slot formed therein, the assembly comprising:
- a first assembly portion;
- a second assembly portion having means for coupling the first assembly portion, the second assembly portion including a first end comprising means for entering data into the handheld computer and a second end having means for coupling to the first assembly portion; and
- an engaging means for engaging the handheld computer, the engagement means being coupled to one of the first assembly portion and the second end of the of the second assembly portion, the means for engaging the handheld computer being disposed at least partially within one of the first assembly portion and the second assembly portion; and
- wherein the first assembly portion and the second assembly portion are each configured so as to enable the assembly to be stored in the slot of the handheld computer.

20. The assembly according to claim 19, wherein the engaging means comprises one of a reset pin, a flat head-type screw driver, a phillips head-type screw driver, a robertson-type screw driver, and an allen wrench-type tool.

21. The assembly according to claim 20, wherein the engaging means is interchangeable.

22. The assembly according to claim 21, wherein the engaging means is detachable.

23. A three-part assembly for use with a handheld computer, the handheld computer including a housing having a slot formed therein, the assembly comprising:
- a first assembly portion;
- a second assembly portion having means for coupling with the first assembly portion, the second assembly portion having a first end and a second end;
- a third assembly portion having means for coupling with the second assembly portion, the third assembly portion including a first end comprising means for entering data into the handheld computer and a second end having means for coupling with the second assembly portion; and
- a first means for engaging the handheld computer coupled to one of the first assembly portion and the second assembly portion and the third assembly portion, the means for engaging the handheld computer disposed at least partially within one of the first assembly portion and the second assembly portion and the third assembly portion; and
- a second means for engaging the handheld computer coupled to one of the first assembly portion and the second assembly portion and the third assembly portion, the means for engaging the handheld computer disposed at least partially within one of the first assembly portion and the second assembly portion and the third assembly portion;
- wherein the first assembly portion, the second assembly portion and the third assembly portion are each dimensioned to be stored in the slot of the handheld computer.

24. The assembly according to claim 23, wherein the first and the second engaging means comprises one of a reset pin, a flat head-type screw driver, a phillips head-type screw driver, a robertson-type screw driver, and an allen wrench-type tool.

25. The assembly according to claim 24, wherein the first and the second engaging means are interchangeable.

26. The assembly according to claim 25, wherein the engaging means is detachable.

27. A stylus adapted to enter data into a hand held electronic device and provide a user with a reset pin to reset the electronic device, the stylus comprising:
- a stylus quill including a reset pin coupled to a first end of the stylus quill;
- a stylus body adapted to be coupled with the first end of the stylus quill, the stylus body being adapted to receive the reset pin when coupled with the stylus quill; and
- a stylus point extending from the stylus body, the stylus point including a first end for entering data into said electronic device and a second end coupled to the stylus body:
- wherein the stylus body and stylus point are each dimensioned to be received and stored within the slot of the handheld computer.

28. A stylus assembly adapted to enter data into an electronic device and provide a user with a tool to engage the electronic device, the stylus assembly comprising:
- a stylus body;
- a stylus point coupled to the stylus body, the stylus point including a first end for entering data into said electronic device and a second end coupled to the stylus body; and
- a tool coupled to one of the stylus body and the second end of the stylus point, the tool to engage said electronic device the tool being at least partially disposed within the other of the stylus point and the stylus body; and
- wherein the stylus body and stylus point are each dimensioned to be received and stored within the slot of the handheld computer.

29. A stylus assembly adapted to enter data into an electronic device and providing a user multiple tools to engage the electronic device, the stylus assembly comprising:
- a stylus quill;
- a stylus body, the stylus body including a first end and a second end, wherein the second end of the stylus body is coupled to the stylus quill;
- a stylus point coupled to the stylus body, the stylus body including a first end to enter data into said electronic device and a second end coupled to the first end of the stylus body;
- a first tool to engage said electronic device detachably coupled to one of the stylus quill and the first and second end of the stylus body and the second end of the stylus point; and
- a second tool to engage said electronic device detachably coupled to the other of the stylus quill and the first and second end of the stylus body and the second end of the stylus point, wherein the first tool and the second tool are housed within one of the stylus quill and the second end of the stylus body when coupled together and the first end of the stylus body and the stylus point when coupled together;
- wherein the stylus body and stylus point are each dimensioned to be received and stored within the slot of the handheld computer.

30. A stylus for entering data into a handheld computer, the handheld computer including a housing having a slot formed therein, the stylus comprising:

a first part and a second part;

an end configured to enter data into the handheld computer by contacting the handheld computer; and a tool housed at least partially within the stylus, the tool being configured to engage a feature on the housing of the handheld computer, the tool being coupled to the first part and disposed within the second part; and wherein the stylus is dimensioned to be stored within a slot of the handheld computer.

31. The stylus according to claim 30, wherein the first part includes a stylus point and the second part includes a stylus body.

* * * * *